(12) United States Patent
Walter et al.

(10) Patent No.: US 11,585,693 B2
(45) Date of Patent: Feb. 21, 2023

(54) SINGLE PHOTON DETECTOR DEVICE

(71) Applicant: WESTFÄLISCHE WILHELMS-UNIVERSITÄT MÜNSTER, Münster (DE)

(72) Inventors: Nicolai Walter, Münster (DE); Wolfram Pernice, Münster (DE); Simone Ferrari, Münster (DE)

(73) Assignee: WESTFÄLISCHE WILHELMS-UNIVERSITÄT MÜNSTER, Münster (DE)

( * ) Notice: Subject to any disclaimer, the term of this patent is extended or adjusted under 35 U.S.C. 154(b) by 0 days.

(21) Appl. No.: 17/299,993

(22) PCT Filed: Dec. 5, 2019

(86) PCT No.: PCT/EP2019/083847
§ 371 (c)(1),
(2) Date: Jun. 4, 2021

(87) PCT Pub. No.: WO2020/115222
PCT Pub. Date: Jun. 11, 2020

(65) Prior Publication Data
US 2021/0381884 A1    Dec. 9, 2021

(30) Foreign Application Priority Data
Dec. 6, 2018   (DE) .......................... 102018131222.9

(51) Int. Cl.
*G01J 1/04* (2006.01)
*G02B 6/02* (2006.01)
(Continued)

(52) U.S. Cl.
CPC .......... *G01J 1/0425* (2013.01); *G02B 6/0229* (2013.01); *B82Y 20/00* (2013.01); *G01J 2001/442* (2013.01)

(58) Field of Classification Search
CPC .............. G01J 1/0425; G01J 2001/442; G02B 6/0229; B82Y 20/00
See application file for complete search history.

(56) References Cited

U.S. PATENT DOCUMENTS 9,500,519 B2    11/2016  Tang et al.
2014/0353476 A1*  12/2014  Bachar .................. G01B 11/00
                                                          250/227.24

FOREIGN PATENT DOCUMENTS

CN    106129141    11/2016
GB      2530500     3/2016

OTHER PUBLICATIONS

PCT International Search Report (w/ English translation) and Written Opinion for corresponding PCT Application No. PCT/EP2019/083847, dated Apr. 3, 2020, 14 pages.

(Continued)

*Primary Examiner* — Georgia Y Epps
*Assistant Examiner* — Don J Williams
(74) *Attorney, Agent, or Firm* — Dority & Manning, P.A.

(57) ABSTRACT

The invention relates to a single photon detector device for detecting an optical signal comprising an optical fiber and at least one nanowire, wherein the optical fiber comprises a core area and a cladding area and is designed to conduct the optical signal along an optical axis, wherein, with respect to the optical axis, a first area of the optical fiber is an entrance area for the optical signal and a second area of the optical fiber is a detector area, and wherein the nanowire becomes superconducting at a predetermined temperature and is designed in the superconducting state to generate an output signal as a function of the optical signal. It is provided that in the detector area of the optical fiber the nanowire extends essentially along the optical axis of the optical fiber. A single photon detector device is thus provided which has a simple (Continued)

Figure 1:
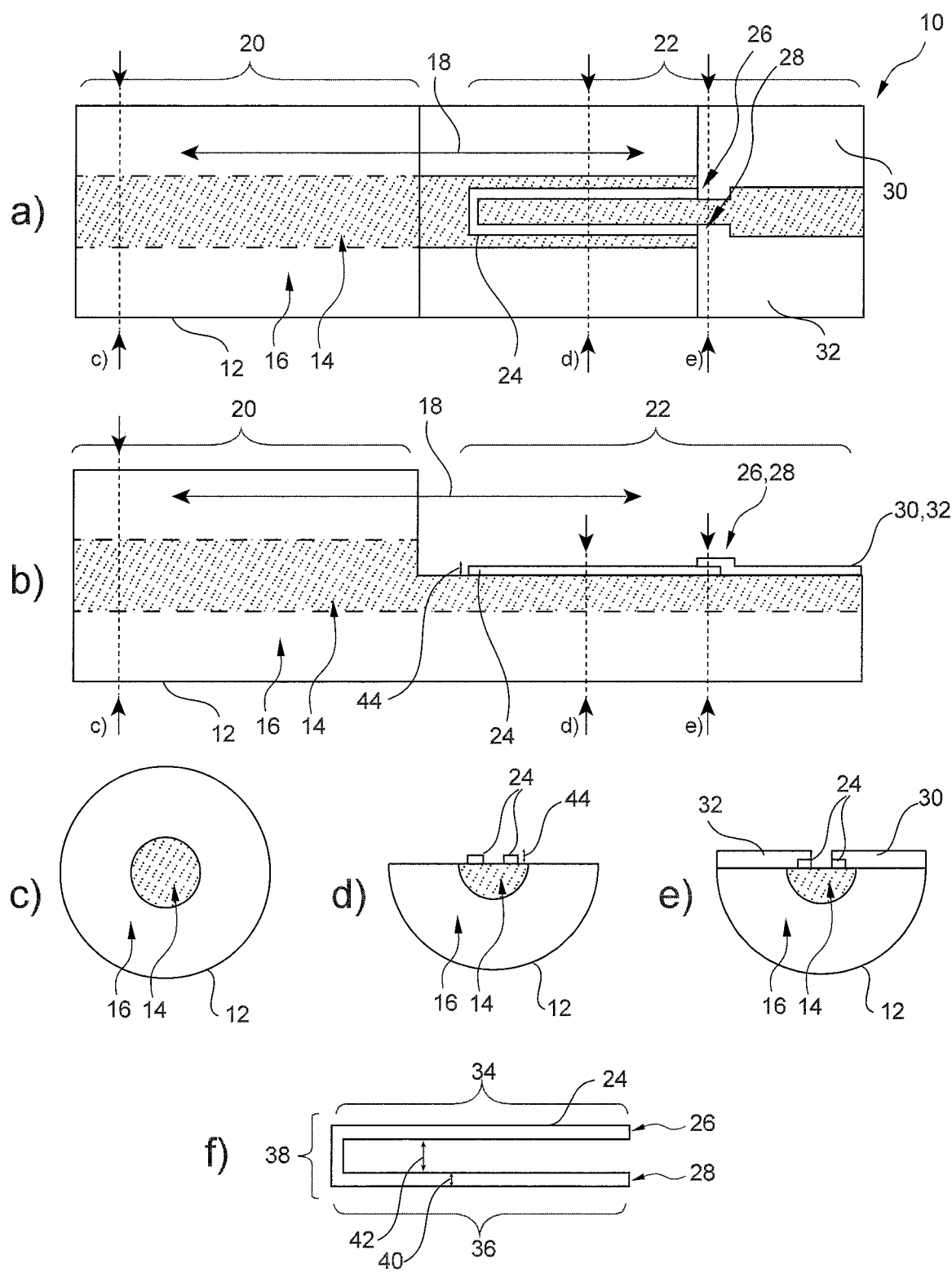

structure, a high efficiency, a high detection rate and a high spectral bandwidth.

12 Claims, 3 Drawing Sheets

(51) Int. Cl.
  *B82Y 20/00* (2011.01)
  *G01J 1/44* (2006.01)

(56) References Cited

OTHER PUBLICATIONS

Xu et al., Microfiber Coupled Superconducting Nanowire Single-Photon Detectors, Optics Communications, Amsterdam, NL, vol. 405, Dec. 15, 2017, pp. 48-52.
You et al. "Microfiber-coupled superconducting nanowire single-photon detector for near-infrared wavelengths," Optics Express, vol. 25, No. 25, Dec. 11, 2017—9 pages.

* cited by examiner

SINGLE PHOTON DETECTOR DEVICE

This application is a national phase entry of PCT International Application No. PCT/EP2019/083847 filed on Dec. 5, 2019, which, in turn, is based upon and claims the right of priority to German Patent Application No. 102018131222.9 filed on Dec. 6, 2018, the disclosures of both of which are hereby incorporated by reference herein in their entirety for all purposes.

The invention relates to a single photon detector device for detecting an optical signal. The invention further relates to a method for manufacturing a single photon detector device.

It is a prerequisite for many applications that the smallest amounts of light are detected, down to individual photons. Single photon detector devices are available for this purpose. for example, avalanche photodiodes (APDs), photomultiplier tubes (PMTs) and superconducting nanowire single photon detectors (SNSPDs). SNSPDs offer the advantage of having low dark count rates, high quantum efficiency, high speed and high time resolution. In all single photon detector devices, the optical signal to be detected must be guided to the detector element. This is usually implemented using optical fibers, also called fiber optic cables, at the ends of which the detector element is coupled. This leads to a loss of the optical signal and thus to a reduction in the efficiency of the detector systems. These coupling losses are particularly important in the case of SNSPDs, since SNSPDs have to be operated in a cooling system.

SNSPD have a nanowire as an actual detector element that is superconducting at sufficiently low temperatures. The detection mechanism is based on the following principle: An external direct current is applied to the nanowire, the magnitude of external direct current being somewhat smaller than the critical current at which the superconductivity of the nanowire breaks down. A photon that strikes the nanowire locally reduces the amount of the critical current below the amount of the applied direct current through the decay of Cooper pairs. This leads to the formation of a localized non-superconducting area or hot spot having finite electrical resistance. Since the local resistance is typically greater than the input impedance of the readout amplifier, the hot spot generates a measurable voltage in the readout amplifier. Since the greater part of the current flows through the readout amplifier, the hot spot cools down again and returns to the superconducting state.

In the domain of integrated optics, U.S. Pat. No. 9,500,519 B2 discloses an SNSPD which can be integrated into a chip. A planar waveguide is located on a substrate, the nanowire being placed on said waveguide. A disadvantage of the device is that the optical signal to be detected has to be guided to the detector device in a complex manner. This is achieved using an optical fiber, at the end of which the detector device is coupled. The optical fiber is brought into spatial proximity to the waveguide and aligned to couple the optical signal into the waveguide. This is very complex and leads to high coupling losses. As a result, the efficiency of the single photon detector device is significantly reduced by the coupling losses. Furthermore, the structure of the single photon detector device is complex, since separate devices are required for the coupling, which also lead to additional manufacturing steps.

A single photon detector device is known from U.S. Pat. No. 9,726,536 B2, the detector of which is manufactured directly on the tip of an optical fiber. The manufacture at the tip of the optical fiber enables precise alignment of the detector with the core of the optical fiber, where the intensity of the optical signal is particularly high. The nanowire is therefore located on a surface perpendicular to the optical axis of the optical fiber. Due to the small thickness of the nanowire, however, the absorption of the optical signal when it passes perpendicularly through the nanowire is very low. The single photon detector device therefore comprises an optical cavity, with the result that the absorption is increased by the back and forth reflection of the optical signal in the optical cavity. This has the disadvantage of the spectral range in which the single photon detector device operates efficiently being small. Furthermore, the cavity makes manufacture more difficult. For an efficient single photon detector device, the nanowire must cover the entire cross section of the optical fiber so that long nanowires are used in a meandering structure. However, as the length of the nanowire increases, the speed or detection rate of the single photon detector device decreases.

Proceeding from this problem, the object of the invention is to provide a single photon detector device which has a simple structure and high efficiency. Furthermore, the single photon detector device should have a high detection rate and a high spectral bandwidth.

This object is achieved by the features of the independent patent claims. Preferred developments can be found in the dependent claims.

According to the invention, a single photon detector device for detecting an optical signal comprising an optical fiber and at least one nanowire is provided, wherein the optical fiber comprises a core area and a cladding area and is designed to guide the optical signal along an optical axis, wherein, based on the optical axis, a first area of the optical fiber is an entrance area for the optical signal and a second area of the optical fiber is a detector area, wherein the nanowire becomes superconducting at a predetermined temperature and in the superconducting state, is designed to generate an output signal as a function of the optical signal. It is provided that, in the detector area of the optical fiber, the nanowire extends essentially along the optical axis of the optical fiber.

A thus constructed single-photon detector device then is particularly suitable for the detection of very small amounts of light down to individual photons, which is a prerequisite for many applications in the field of quantum optics, for example. The single photon detector device is characterized by a high quantum efficiency close to one, a high speed, a high time resolution, and a low dark count rate.

The single photon detector device is thus integrated into the optical fiber, so that coupling losses due to the connection between the detector device and the optical fiber, as are disadvantageously known from the prior art, are essentially eliminated. The single photon detector device is very efficient due to its dispensing of the connection. An essential aspect of the invention is that the nanowire extends along the optical axis of the optical fiber. This leads to the absorption of the optical signal by the nanowire no longer being dependent on the thickness of the nanowire but rather on the length thereof. The absorption can thus be determined by the length of the nanowire. A cavity can be dispensed with since the absorption of the nanowire is higher due to said structure than when the nanowire is aligned perpendicular to the optical axis. This leads to a single photon detector device having a particularly simple structure that is easy to manufacture. By dispensing with the cavity, the single photon detector device has a high system efficiency with a high spectral bandwidth. Furthermore, the single photon detector device is particularly sensitive due to higher absorption. It is also not necessary to use particularly long nanowires, since, in comparison to the prior art, the entire cross section of the optical fiber does not have to be covered. Because the detection rate of the single photon detector device decreases with increasing length of the nanowire, the alignment of the nanowire along the optical axis also leads to a high detection rate of the single photon detector device.

An optical signal which is detected by the single photon detector device is to be understood as meaning electromagnetic radiation in the ultraviolet, visible and infrared spectral range, that is, having a wavelength between 200 nm and 5 μm. Particularly, this is to be understood as a single photon in the specified spectral range or very few photons in the specified spectral range. The optical signal is therefore a very small amount of light that can be detected using the single photon detector device.

An optical fiber, also called fiber optic cable or glass fiber, is suitable for guiding the optical signal. It has an optical axis along which the optical signal is conducted. The optical fiber can be a dielectric waveguide, that is, a waveguide which is constructed from an electrically weakly conductive or non-conductive, non-metallic substance. The optical fiber is characterized in that it consists of a core area and a cladding area, the two areas having different refractive indices. The optical fiber can be a step index fiber or a graded index fiber. The optical fiber can be a multimode fiber or a single mode fiber.

The optical fiber thus forwards the optical signal along its optical axis, wherein it is provided that one area of the optical fiber is the entrance area for the optical signal and a second area of the optical fiber is the detector area, in which the nanowire extends. The optical signal is thus conducted from the entrance area into the detector area, where it impinges the nanowire, which is the actual detector element of the single photon detector device. For this purpose, the nanowire is superconducting at a sufficiently low temperature, that is, it no longer exhibits any electrical resistance. In the superconducting state, the nanowire is designed to generate an output signal as a function of the optical signal.

With regard to the generation of the output signal, a preferred development of the invention provides that the ends of the nanowire are each connected to one electrode. This makes it possible to supply the nanowire with an external direct current that is somewhat smaller in magnitude than the critical current at which the superconductivity of the nanowire breaks down. In said state, the impact of a photon on the nanowire leads to a localized non-superconducting area having finite electrical resistance, as a result of which a measurable voltage is generated in the readout amplifier. The electrodes are preferably made of a metallic material, for example, chromium and/or gold. In principle, the electrodes can be located at any position on the optical fiber, as long as they are in contact with the nanowire. However, the electrodes are preferably located at the tip of the optical fiber. This makes the manufacture of the single photon detector device particularly simple.

The photon is absorbed by the nanowire for the detection of the optical signal. With regard to high absorption by the nanowire, a preferred development of the invention provides that the nanowire extends essentially within the core area, on the core area, between the core area and the cladding area, within the cladding area and/or on the cladding area of the optical fiber. A different intensity distribution of the optical signal in the optical fiber results from the type of optical fiber (single mode fiber or multimode fiber), the dimensions of the core and cladding area and the wavelength of the optical signal. For example, the optical signal can be conducted in the core area of the optical fiber. Accordingly, it is advantageous when the nanowire is located in the area of the optical fiber where there is a high intensity of the optical signal, that is, also in the core area or between the core area and the cladding area. Alternatively, the optical signal can be guided in the cladding area of the optical fiber. In this case, it is advantageous, for example, when the nanowire is also located in the cladding area or on the cladding area. This leads to a high absorption of the optical signal by the nanowire and thus to a particularly sensitive single photon detector device. Alternatively, it is also possible for the optical signal to be first conducted in the core area of the optical fiber and then to shift into the cladding area as the optical fiber continues. The nanowire can then also extend from the core area of the optical fiber into the cladding area. The nanowire can in each case be surrounded by the core area or cladding area. Alternatively, however, the nanowire can rest against the core or cladding area. It is advantageous for the nanowire to be surrounded by the core or cladding area for improved absorption, reduced scattering and greater robustness.

In principle, the nanowire can extend in any desired shape along the optical axis of the optical fiber. For example, it can meander along the optical axis or perpendicular to the optical axis. However, as the length of the nanowire increases, the detection rate of the single photon detector device decreases. In contrast, the greater the length of the nanowire along the optical axis, the greater the sensitivity of the single photon detector device. With regard to a good balance, a preferred development of the invention provides that the nanowire comprises two regions which extend essentially parallel to one another along the optical axis and that the two regions are connected at their ends by a third region, so that the nanowire is designed essentially U-shaped. Said U-shape combines a high detection rate of the single photon detector device with a high sensitivity and is also easy to manufacture. One advantage of the U-shape is that the ends of the nanowire are essentially at the same point in relation to the optical axis. This simplifies the attachment of the electrodes and thus the manufacture of the single photon detector device. A double U-shape or W-shape is possible as an alternative to the U-shape. The two ends of the "W" are also essentially at the same point in relation to the optical axis. However, the nanowire with the W-shape has a longer length compared to the U-shape with constant expansion along the optical axis. This also increases the absorption of the nanowire.

In principle, it is possible for the single photon detector device to comprise a nanowire. In a preferred development of the invention, however, it is provided for the single photon detector device to comprise a plurality of nanowires. This has the advantage that a plurality of detector elements can be integrated into one optical fiber, which results in the single photon detector device being particularly reliable. The length and shape of the nanowires can be the same for all nanowires, for example. Alternatively, the length and/or the shape of the nanowires can also be different.

In a preferred development of the invention, it is provided that the nanowire consists of at least one of the materials from the group of NbN, NbTiN, $Nb_3Sn$, $MgB_2$, $W_xSi_{1-x}$, iron-containing high-temperature superconductors (iron pnictide), high-temperature superconductors having copper oxide, particularly YBCO and/or BSCCO. The nanowire can consist of one of the materials or of a plurality of the materials in any combination. Alternatively or in addition, it can also consist of further superconducting materials. Low-temperature superconductors such as NbTi, further metallic superconductors such as $Nb_3Ge$ or superconductors having iron arsenide such as $SmFeAsO_{1-x}F_x$ or CeOFeAs can be used for this. Alternatively or in addition, further superconducting materials can be used, for example, MoRe, MoSi, TaN, or graphene.

In a further preferred development of the invention, it is provided that the nanowire has an essentially rectangular cross section, wherein the thickness of the nanowire is between 0.5 and 100 nm and the width of the nanowire is between 20 and 400 nm. The thickness of the nanowire can be influenced during the manufacturing process by the thickness of the superconducting layer that is deposited. After the deposition, the layer can be structured, for example, by electron beam lithography and plasma-assisted etching processes, wherein the width of the nanowire can be determined.

In this context, a further preferred development of the invention provides that the length of the nanowire is between 200 nm and 200 μm. The length corresponds to the extension of the nanowire from one end to the other end. Since the nanowire can have a meandering shape, a U-shape, or any other arbitrary shape, the length of the nanowire does not necessarily correspond to the extension of the nanowire along the optical axis. The length of the nanowire allows the absorption and the speed of the single photon detector device to be determined. The longer the nanowire, the higher the absorption and the more sensitive the device. The shorter the nanowire, the higher the detection rate of the single photon detector device. The length of the nanowire, like the width and thickness, can also be changed by the manufacturing process. The single photon detector device can thus be adapted for special applications.

In a preferred development of the invention, it is provided that the optical fiber in the entrance area has an essentially circular cross section, the diameter of which is between 75 μm and 200 μm, wherein in the entrance area of the optical fiber, the core area of the optical fiber likewise has an essentially circular cross section, the diameter of which is between 2 μm and 20 μm and the core area is essentially concentrically surrounded by the cladding area. Said optical fiber is therefore a fiber, the cross section of which in the entrance area is essentially circular and not a planar fiber optic cable structure having an essentially rectangular cross section. The diameter of the core area and the diameter of the optical fiber can be adapted to the wavelength of the optical signal and to the number of vibrational modes that can propagate. In the entrance area, the core area of the optical fiber is located in the middle of the optical fiber and is surrounded concentrically by the cladding area. In principle, it is possible for the optical fiber in the detector area to also have an essentially circular cross section and the core area to be concentrically surrounded by the cladding area. Alternatively, it is possible for the optical fiber to not have a circular cross section in the detector area. For example, part of the cladding area can be removed chemically or mechanically. This creates a cross section which essentially has the shape of a segment of a circle or is essentially semicircular. The cladding area may only be removed slightly, so that the core area is still always surrounded by the cladding area. Alternatively, it is possible for the cladding area in the detector area of the optical fiber to be so heavily removed that the core area of the optical fiber in the detector area is no longer completely surrounded by the cladding area.

The optical fiber consists, for example, of pure quartz glass (silicon dioxide: $SiO_2$), wherein the refractive index is changed in the core area by doping with germanium or phosphorus, for example. In this case, small amounts of germanium dioxide ($GeO_2$) or phosphorus pentoxide ($P_2O_5$) also arise in the amorphous silicon dioxide structure of the quartz glass. However, it is also possible to manufacture the core area from pure $SiO_2$ and to dope the cladding area with, for example, boron or fluorine in order to change the refractive index of the cladding area. The optical fiber can be a standard optical fiber product, such as a glass fiber.

In principle, it is possible for the optical fiber in the detector area to have essentially the same diameter as in the entrance area. Alternatively, a preferred development of the invention provides that the optical fiber tapers in the detector area and/or that the optical fiber is a drawn optical fiber. The tapering of the optical fiber in the detector area leads to the diameter of the optical fiber changing along the optical axis. This also changes the properties of the optical fiber with regard to the conductance of the optical signal. A drawn optical fiber has a tapered diameter. For a drawn optical fiber, the diameter of the core area of the optical fiber in the entrance area is larger than the wavelength of the optical signal. The diameter of the optical fiber, and the diameter of the core area, then gradually decrease along the optical axis and in the detector area, the diameter of the core area has a value which is smaller than the wavelength of the optical signal. As a result, the optical signal in the detector area is no longer conducted in the core area, but rather in the cladding area. This can lead to an improved absorption of the optical signal by the nanowire, for example, when the nanowire is located on the cladding area of the optical fiber.

According to the invention, a method for manufacturing the single photon detector device is also provided.

The method of manufacturing a single photon detector device comprises the following steps:

providing an optical fiber, wherein the optical fiber comprises a core area and a cladding area and is designed to conduct an optical signal along an optical axis, wherein, with respect to the optical axis, a first area of the optical fiber is an entrance area for the optical signal and a second area of the optical fiber is a detector area, forming a nanowire directly on the optical fiber, wherein the nanowire becomes superconducting at a predetermined temperature and, in the superconducting state, is designed to generate an output signal as a function of the optical signal, characterized in that the formation of the nanowire in the detector area of the optical fiber takes place essentially along the optical axis of the optical fiber.

The method thus forms a nanowire on the optical fiber, wherein all steps of the formation of the nanowire are carried out directly on the optical fiber. For example, a layer of the material from which the nanowire is made can be deposited directly on the optical fiber by means of magnetron sputtering. The layer can then be structured, for example, by electron beam lithography and plasma-assisted etching processes. All steps are therefore carried out directly on the optical fiber, which greatly simplifies the manufacture of the single photon detector device. An essential aspect is that the formation of the nanowire in the detector area of the optical fiber takes place essentially along the optical axis of the optical fiber. With regard to the advantages of such a single photon detector device, reference is made to the single photon detector device described above.

In a preferred development of the invention, it is provided that the method additionally comprises the step of removing the cladding area and/or core area of the optical fiber in the detector area. The removal can be done chemically or physically. This enables the nanowire to be formed on the core area and/or on the cladding area of the optical fiber. Furthermore, it is possible for, after the formation of the nanowire, material of the core area and/or of the cladding area to be applied again to the nanowire. The nanowire can thus also be formed within the core area, between the core area and the cladding area and/or within the cladding area.

The invention is explained below by way of example with reference to the drawings based on a preferred embodiment.

The drawings show

FIG. 1 several schematic representations of a single photon detector device according to an embodiment of the invention.

Figure 2:
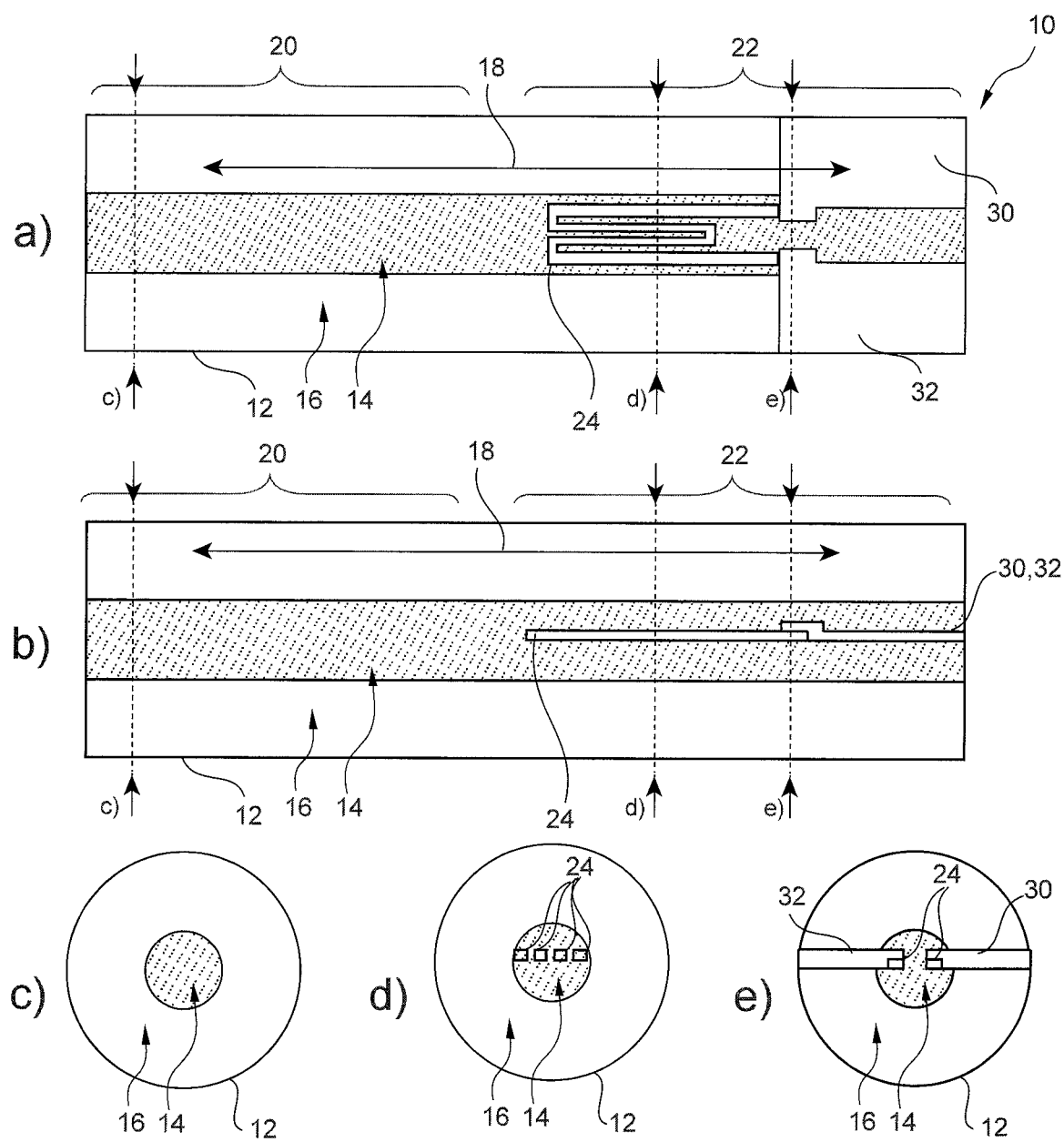
Figure 3:
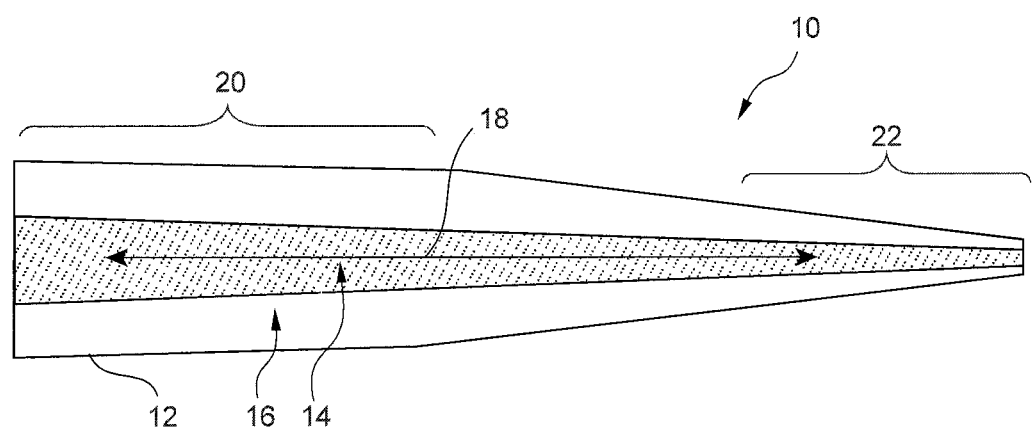

FIG. 2 several schematic representations of the single photon detector device according to an alternative embodiment of the invention and FIG. 3 a schematic representation of the single photon detector device according to a further alternative embodiment of the invention.

FIG. 1 shows several schematic representations of a single photon detector device 10 according to a preferred embodiment of the invention. FIG. 1a) shows the single photon detector device 10 in a top view and FIG. 1b) in a side view. FIGS. 1c), 1d) and 1e) are each sectional views through the locations defined in FIGS. 1a) and 1b). FIG. 1f) shows a larger representation of a nanowire 24 from FIG. 1a). The single photon detector device 10 comprises an optical fiber 12 which consists of a core area 14 and a cladding area 16. The optical fiber 12 is designed to guide an optical signal along an optical axis 18. A first area of the optical fiber 12 is accordingly an entrance area 20 for the optical signal, which is then conducted along the optical axis 18 to a detector area 22. The cross section of the optical fiber 12 is circular in the entrance area (FIG. 1c), wherein the cladding area 16 concentrically surrounds the core area 15. In the preferred embodiment, the optical fiber 12 is a single mode fiber made of quartz glass for a wavelength of 1550 nm. In the entrance area 20, the diameter of the core area is approximately 9 μm and the diameter of the optical fiber 12 is approximately 125 μm. The single photon detector device 10 comprises the nanowire 24 in the detector area 22 as the actual detector element. The nanowire 24 consists of a material which becomes superconducting at suitably low temperatures (transition temperature). In the embodiment of the invention preferred here, the nanowire 24 consists of NbN, wherein the transition temperature of NbN is approximately 16.5 K. The nanowire 24 runs essentially along the optical axis 18, the nanowire being connected to an electrode 30, 32 at each of the ends 26, 28 thereof. The nanowire 24 essentially consists of three regions 34, 36, 38, wherein two of the regions 34, 36 extend essentially parallel to one another along the optical axis 18 and the two regions 34, 36 are connected at the ends thereof by the third region 38, so that the nanowire 24 is designed essentially U-shaped (FIG. 1f). The two ends 26, 28 of the U-shape are essentially at the same point in relation to the optical axis 18, namely at the tip of the optical fiber 12. The length of the nanowire 24 is approximately 800 nm, so that it extends approximately 300 nm along the optical axis 18. The nanowire 24 comprises an essentially rectangular cross section, wherein the width of the nanowire 24 is approximately 100 nm. The distance 42 between the two regions 34, 36 of the nanowire 24 is approximately 120 nm and the nanowire 24 has a thickness 44 of approximately 6 nm.

In the embodiment of the invention preferred here, the nanowire 24 is located on the core area 14 of the optical fiber 12. For this purpose, the optical fiber 12 is stripped in the detector area 22 so that it does not have a circular cross section there (FIGS. 1d and 1e). The cross section in the detector area 22 is semicircular. The nanowire 24 is applied to the core area 14 of the optical fiber 12. To connect the ends 26, 28 of the nanowire 24 to the electrodes 30, 32, the electrodes overlay the nanowire 24 at the ends thereof 26, 30.

The nanowire 24 is formed by means of magnetron sputtering, wherein a layer of NbN is deposited directly on the core area of the optical fiber 12. The layer is then structured by electron beam lithography and plasma-assisted etching processes, as a result of which the U-shape of the nanowire 24 is created.

FIG. 2 shows a schematic representation of an alternative embodiment of the single photon detector device 10. FIG. 2a) shows the single photon detector device 10 in a top view and FIG. 2b) in a side view. FIGS. 2c), 2d) and 2e) are each sectional views through the locations defined in FIGS. 2a) and 2b). The differences to the single photon detector device 10, which has been described in FIG. 1, are discussed below. In the alternative embodiment of the invention in FIG. 2, the nanowire 24 does not have a U-shape but rather a double U-shape or W-shape. The nanowire 24 is accordingly also longer and has a length of approximately 1,500 nm. Furthermore, compared to FIG. 1, the nanowire 24 is not located on the core area 14 of the optical fiber 12 but rather in the core area 14. The nanowire 24 is therefore surrounded by the core area 14. In the alternative embodiment of the invention, the cross section of the optical fiber 12 is circular not only in the entrance area 20, but also in the detector area 22.

FIG. 3 shows a schematic representation of a further embodiment of the single photon detector device 10. In this embodiment, the optical fiber 12 tapers along the optical axis 18. It is a drawn fiber in which the optical signal is guided in the entrance area 20 in the core area 14 of the drawn fiber. The diameter of the drawn fiber is approximately 125 μm in the entrance area 20. As a result of the successive tapering, the optical signal is conducted more and more into the cladding area 16 as it continues. In the detector area 22, the optical signal is then conducted by the cladding area 16, wherein the diameter of the drawn fiber in the detector area 22 is only in the range of 0.5 to 5 μm. In this embodiment, the nanowire 24 is located on or alternatively in the cladding area of the optical fiber 12 (not shown), since the intensity of the optical signal is highest here.

LIST OF REFERENCE SYMBOLS 10 single photon detector device
12 optical fiber
14 core area
16 cladding area
18 optical axis
20 entrance area
22 detector area
24 nanowire
26 first end of the nanowire
28 second end of the nanowire
30 first electrode
32 second electrode
34 first region of the nanowire
36 second region of the nanowire
38 third region of the nanowire
40 width of the nanowire
42 distance between the first and second region of the nanowire
44 thickness of the nanowire

The invention claimed is:

1. A single photon detector device for detecting an optical signal comprising an optical fiber and at least one nanowire, the optical fiber comprising a core area and being designed to conduct the optical signal along an optical axis, with respect to the optical axis, a first area of the optical fiber being an entrance area for the optical signal and a second area of the optical fiber being a detector area, and the nanowire becoming superconducting at a predetermined temperature and being designed in the superconducting state to generate an output signal as a function of the optical signal, wherein, in the detector area of the optical fiber, the nanowire extends essentially along the optical axis of the optical fiber.

2. The single photon detector device according to claim 1, characterized in that the ends of the nanowire are each connected to an electrode.

3. The single photon detector device according to claim 1, wherein the nanowire essentially extends within the core area, on the core area, between the core area and the cladding area, within the cladding area and/or on the cladding area of the optical fiber.

4. The single photon detector device according to claim 1, wherein the nanowire comprises two regions which extend essentially parallel to one another along the optical axis and that the two regions are connected at the ends thereof by a third region, so that the nanowire is designed essentially U-shaped.

5. The single photon detector device according to claim 1, wherein the single photon detector device comprises a plurality of nanowires.

6. The single photon detector device according to claim 1, wherein the nanowire consists of at least one of the materials from the group of NbN, NbTiN, $Nb_3Sn$, $MgB_2$, $W_xSi_{1-x}$, iron-containing high-temperature superconductors, high-temperature superconductors having copper oxide, particularly YBCO and/or BSCCO.

7. The single photon detector device according to claim 1, wherein the nanowire has an essentially rectangular cross section, wherein a thickness of the nanowire is between 0.5 and 100 nm and a width of the nanowire is between 20 and 400 nm.

8. The single photon detector device according to claim 1, wherein the length of the nanowire is between 200 nm and 200 μm.

9. The single photon detector device according to claim 1, wherein the optical fiber in the entrance area has an essentially circular cross section, the diameter of which is between 75 and 200 μm, wherein in the entrance area of the optical fiber, the core area of the optical fiber also has an essentially circular cross section, the diameter of which is between 2 and 20 μm and the core area is essentially concentrically surrounded by the cladding area.

10. The single photon detector device according to claim 1, wherein the optical fiber tapers in the detector area and/or that the optical fiber is a drawn optical fiber.

11. A method of manufacturing a single photon detector device according to claim 1, comprising the steps of:
providing an optical fiber, the optical fiber comprising a core area and a cladding area and being designed to conduct an optical signal along an optical axis, with reference to the optical axis, a first area of the optical fiber being an entrance area for the optical signal and a second area of the optical fiber being a detector area,
forming a nanowire directly on the optical fiber, the nanowire being superconducting at a suitably low temperature and being designed in the superconducting state to generate an output signal as a function of the optical signal,
wherein the formation of the nanowire in the detector area of the optical fiber takes place essentially along the optical axis of the optical fiber.

12. The method according to claim 11, wherein the method additionally comprises the following step:
removing the cladding area and/or core area of the optical fiber in the detector area.

* * * * *